2,915,086
Patented Dec. 1, 1959

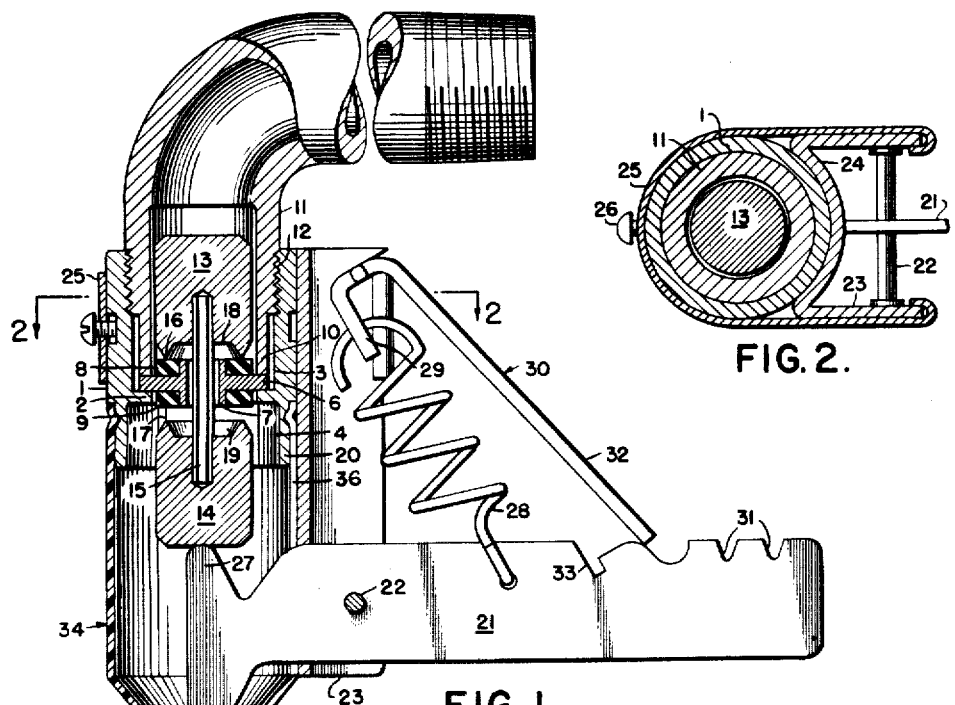
FIG. 2.
FIG. 1.
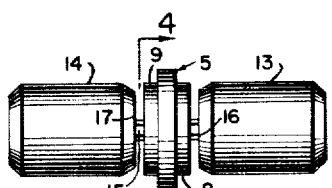
FIG. 3.
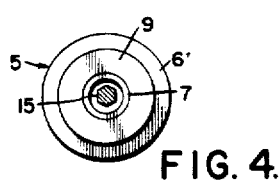
FIG. 4.
*INVENTOR.*
James B. Godshalk
*ATTORNEY*

United States Patent Office

2,915,086
VALVES

James B. Godshalk, West Pikeland Township, Chester County, Pa., assignor to Fox Products Company, Philadelphia, Pa., a corporation of Pennsylvania Continuation of application Serial No. 411,097, February 18, 1954. This application June 6, 1956, Serial No. 590,800

6 Claims. (Cl. 137—614.14)

This invention relates to automatic poultry watering valves and particularly to an improved valve of the general type disclosed in Reissue Patent 23,447, issued December 25, 1951, to V. H. Pruitt, and Patent 2,579,962, issued December 25, 1951, to V. H. Pruitt and L. A. Hedler. The present application is a continuation of my copending application Serial Number 411,097, filed February 18, 1954, now abandoned.

Valves of this general type are designed to maintain an adequate quantity of water in a watering trough or the like, and employ a double-acting valve mechanism arranged to respond automatically to the weight of the trough. The valve is so constructed as to remain closed if the trough is empty, to be maintained open by the weight of a predetermined minimum amount of water in the trough, and to close automatically when a predetermined maximum amount of water is accumulated in the trough. As fully disclosed in the aforementioned patents, the valve mechanism includes a movable valve operating member biased in one direction by a spring, the weight of the trough and any water therein operating against the action of the spring.

Such devices have attained considerable commercial acceptance in recent years and are presently being used in great quantities in broiler raising plants and the like throughout the country. However, prior to the present invention, automatic poultry valves of this type have presented a number of practical difficulties resulting in a short operating life and excessive servicing and replacements.

I have observed that these valves are subject to excessive corrosion and rust deposits, so that the moving parts of the valve assembly require cleaning or replacement in a relatively short time. Moreover, I have discovered that rust formation in such valves occurs almost entirely in those portions of the valve where the water contacts air in the form of a spray, so that iron in the water is oxidized and precipitates to form voluminous rust deposits which tend to hamper or prohibit movement of the valve parts.

I have also discovered that valves of the type referred to frequently fail in service because of erosion of the cavitation or mechanical type caused at the valve seat by high velocity water flow. The velocity of the water flow is not excessive when the valve is fully open but is greatly increased as the valve closes. This problem is greatly accentuated because the sealing surfaces of the valve, being annular, ordinarily do not seat simultaneously over the entire annulus, with the result that there is almost always a high velocity jet of water flowing over some portion of the seat during the closing action.

In working with valves in actual service under various conditions ordinarily met with on chicken farms and the like, I have observed that the prior-art poultry valves are very difficult to clean and service so that it is often general practice simply to replace the entire valve rather than attempt to service it. In particular, I have found it to be very difficult to remove the rust deposits formed in the conventional valves.

Generally stated, the object of the present invention is to provide an improved automatic poultry valve wherein the disadvantages discussed above are overcome.

A particular object of the invention is to devise a valve of the type described wherein the formation of rust deposits is minimized and wherein the conditions tending toward deposition of rust are limited to a portion of the valve where any rust formed will not tend to interfere with the moving parts of the device.

Another object is to provide such a device which is very readily disassembled and wherein the portion of the valve subject to rust deposition is highly accessible for easy cleaning.

A further object is to provide a valve of the type deferred to wherein mechanical or cavitation erosion is minimized. In this connection, the operation of a valve constructed in accordance with the invention is characterized by a "toggle action" resulting in a rapid filling of the trough or other receptacle to the desired level and an abrupt cut-off in the flow of water when that level is reached, so that the period of high velocity water flow tending to cause mechanical erosion of the valve seat is minimized.

In order that these and other objects of the invention may be understood in detail, reference is had to the accompanying drawings which form a part of this specification and wherein:

Fig. 1 is a vertical sectional view of a valve constructed in accordance with the invention, with some parts shown in elevation;

Fig. 2 is a transverse sectional view taken on the line 2—2, Fig. 1;

Fig. 3 is a side elevation of the movable valve member assembly of the device of Fig. 1, and Fig. 4 is a transverse sectional view taken on the line 4—4, Fig. 3.

Referring now to the drawings in detail, it will be seen that the embodiment of the invention there disclosed includes a main cylindrical valve body 1 having a transverse inturned annular shoulder 2. The annular shoulder or flange divides the interior of the valve body 1 into an upper valve chamber 3 and a lower valve chamber 4.

Supported on the shoulder 2 is an annular bushing 5 comprising a flat, disc-like body 6 and a central cylindrical portion 7, the arrangement being such that, when the bushing 5 is in its normal position in the valve body 1, the bore of the portion 7 is coaxially aligned with the bore of the valve body. Each face of the disc-like body 6 of this bushing is provided with an annular gasket as indicated at 8 and 9, these gaskets embracing the cylindrical portion 7, as seen in Fig. 1, and constituting the valve seats. I prefer to make the body of the bushing 5 of brass and to mold the gaskets 8 and 9, which may be of 40-50 durometer rubber, directly in place on the body of the bushing so that the completed assembly is as shown in Fig. 1.

The bushing 5 is held in place by the end 10 of the supply tube or pipe 11, the tube or pipe 11 being removably threaded to the valve body 1 at 12 as shown in Fig. 1. Thus, as the pipe 11 is threaded into the valve body 1, its end 10 engages the outer rim portion of the body 6 of the bushing 5, clamping the same against the top surface of the flange 2. The gasket 9 is thus centered within the bore of the flange 2, as shown, so that the gasket 9 is exposed in the lower valve chamber 4 while the gasket 8 is exposed in the upper valve chamber 3.

The movable valve elements, as seen in Figs. 1 and 3, comprise a pair of cylindrical members 13 and 14 seeured to a shaft 15. The shaft 15 extends through the bore of the cylindrical portion 7 of the bushing 5, so that the shaft 15 is freely slidable with respect to the bushing, the shaft being smaller than the bore so that liquid may pass through the valve. Each of the movable valve members 13, 14, is provided with a relatively sharp annular valve face, as indicated at 16 and 17, these faces cooperating with the gaskets 8 and 9 of the bushing 5 during movement of the valve members. Thus, the opposed ends of the members 13 and 14 are conically tapered on the outside and are provided with frusto-conical recesses 18 and 19, as seen in Fig. 1, so that only the relatively narrow annular faces 16 and 17 remain for contact with the seats 8 and 9.

In assembling the mechanism thus far described, the bushing 5 is placed on the shaft 15 and valve bodies 13 and 14 are then secured one on each side of the bushing, as being force-fit to the shaft. This assembly is then dropped into the top of the valve body 1, so that the outer portion of the disc-like body 6 of the bushing rests upon the shoulder 2. The supply pipe or tube 11 is then screwed into the valve body 1 until the end 10 thereof engages the disc-like body 6 of the bushing and clamps the same against the flange 2. It will now be seen that the upper movable valve member 13 fits rather snugly within the end portion of the tube 11 and that the lower movable valve member 14 is located partially within the lower valve chamber 4 and depends from the entire assembly so far described. Thus, the lower valve chamber 4 is defined by what may be referred to as a skirt 20 which is relatively short, being very substantially shorter than the length of the lower movable valve member 14.

In normal rest position, the upper valve member 13 engages the upper gasket 8 of the bushing 5, so that water may not flow past the valve member 13 into the space between cylindrical portion 7 of the bushing and shaft 15. In this position, the lower valve member 14 is spaced somewhat below the lower gasket 9. It will be understood that, if the assembly comprising valve elements 13 and 14 and the shaft 15 is raised slightly from the position just described and shown in Fig. 1, a condition will be reached in which both valve members 13 and 14 are spaced from the corresponding gaskets or seats 8 and 9, so that water may flow through the pipe 11, past the valve member 13, through the annular space between the cylindrical portion 7 of the bushing 5 and the shaft 15, and downwardly about the lower valve member 14. If the upward movement of the movable valve members should be continued, the sealing face 17 of the lower valve member 14 will come into engagement with the lower gasket 9 of the bushing 5, so cutting off the flow of water again, though the movable member 13 is raised out of contact with the upper gasket 8.

To effect such movement, I provide a spring biased valve operating lever 21 associated with latching means of the type described in copending application Serial Number 411,051 filed February 18, 1954, and now abandoned, by Robert E. Witham. The lever 21 is pivoted on a shaft 22 journalled in bearings carried by a bracket 23. The bracket 23 is of generally U-shaped cross section, the base 24 of the U being curved to fit the outer surface of the valve body 1. The bracket 23 is secured in place by a sheet metal clip 25 having its free ends hooked around the extremities of the bracket arms and being provided with screw 26 or other suitable means for fixing the same in position. The inner end of the lever 21 is provided with an upwardly extending portion 27 having a rounded tip engaging the lower end of the movable valve member 24, as seen in Fig. 1. The lever 21 is biased to close the valve by means of a spring 28, one end of the spring being connected to the lever in any suitable manner and the other end being connected to the short arm 29 of a latch member 30. When the latch member 30 is disengaged, as seen in Fig. 1, spring 28 functions to pivot lever 21 to a point in which portion 27 thereof occupies its lowest position. Thus, the upper valve member 13 is allowed to engage the upper gasket 8, shutting off the flow of water. Lever 21 is provided with one or more notches 31 to receive the bail, not shown, supporting the usual watering trough or other receptacle.

As has been previously pointed out, the weight of the empty trough or receptacle is insufficient to extend the spring 28 and thus pivot lever 21 to raise the movable valve elements 13 and 14 and open the valve. Accordingly, to commence filling the trough, the latch member 30 is pivoted to bring the end of the long arm 32 thereof into engagement in the angular notch 33 in lever 21. Such manipulation of the latch member 30 causes the lever 21 to be pivoted to raise the movable valve assembly sufficiently to unseat valve member 13, allowing the flow of water through the valve to the trough or other receptacle. As the flow of water continues, and the trough is filled to a considerable extent, lever 21 is pivoted downwardly by the weight of the trough against the tension of spring 28 until the arm 32 of latch 30 is freed from its retaining notch 33, escaping then to an inactive position. As the weight of the water in the trough increases, the lever 21 will be further pivoted to eventually close the valve when the lower movable valve member 14 seats against the gasket 9. As the supply of water in the trough or other receptacle is exhausted, spring 28 will urge the lever 21 upwardly, opening the valve again at a point determined by construction and adjustment of the various components thereof. Should the trough be accidentally upset, so that all of the water, or substantially all of the water is spilled therefrom, spring 28 will pivot the lever 21 so far that the valve is closed by reason of engagement between the upper valve member 13 and gasket 8.

It will be noted that the upper valve member 13 fits quite snugly within the end of the supply tube or pipe 11. I have discovered that, if the clearance between the upper valve member and the pipe or tube 11 is properly chosen, a downwardly acting hydraulic frictional force tending to oppose upward movements of the movable valve member 13 will be established during flow of water through the valve, which force will fall off very rapidly substantially at the cut-off point of the valve. Thus, when the valve is being closed by accumulation of water in the trough, the flow will be terminated suddenly rather than gradually. Accordingly, I am able to adjust my valve in such a manner that it will act to substantially completely fill the trough at a high rate of flow and then abruptly terminate the rate of flow, so avoiding one of the major disadvantages of prior art devices of this type.

It will be understood that the water pressures and the sizes of the various valve elements remain more or less uniform insofar as poultry watering valves are concerned. Under ordinary conditions, I find that a satisfactory toggle action is provided when the clearance between the upper movable valve member 13 and its surrounding supply pipe 11 is within the limits of .005″–.020″. If this clearance is too great, being beyond the upper limit just mentioned, there will be an inadequate toggle action, so that the termination of flow is too gradual. On the other hand, if the clearance is made smaller than the range just referred to, the toggle action will be too great, so that there is an excessive water level difference between the shut-off point and the turn-on point.

From the foregoing description, it will be noted that closing of the valve is normally effected as a result of upward movement of the valve assembly caused by the increasing weight of the trough and water therein. If it were not for the "toggle action" described, repeated closing actions of the valve would result in cavitation erosion of the valve seat 17 of member 14, because of the high velocity water flow across the annular surface 17 during slow closing of the valve. But, because of the abrupt cessation of the downwardly acting hydraulic frictional force caused by the close fit between members 13 and 11, the normal closing action in valves constructed in accordance with the invention is very abrupt so that high velocity flow and the resulting cavitation erosion of the surface 17 are minimized.

Since in this construction only the movable valve member 14 subjected to any mechanical erosion, I prefer to make that member of hard brass or bronze or stainless steel, other elements of the device being fabricated from materials which can be more readily machined.

In devices of the type described, it is necessary to provide a discharge nozzle to control the flow of water from the valve to the trough or other receptacle and in the present case I employ such a nozzle to complete the lower valve chamber 4. Thus, I provide a removable nozzle 34, Fig. 1, having a top portion telescopically embracing the skirt 20 of the valve body 1, and extending downwardly well past the lower movable valve member and the lever 21 to terminate in a discharge tip 35 of reduced diameter. The nozzle 34 is provided with a vertical slot 36 to accommodate the inner end of lever 21 and also to allow air to be aspirated into the nozzle to provide a non-tubulant discharge. It will also be noted that the operating tip of lever 21 is provided with a downwardly extending point 37 which serves to further reduce any tendency of the discharge of the nozzle to splash.

I have observed that most of the difficulty in prior art devices of this type occasioned by corrosion and rust deposition occurs in the lower valve chamber. Accordingly, it will be noted that the present invention provides a structure wherein the lower valve chamber is completely accessible for cleaning when the nozzle 34 is removed, the skirt 20 being relatively short so that the lower movable valve member is largely exposed. Also, the entire valve may be quickly disassembled simply by unscrewing the supply pipe 11 and lifting out the movable valve member assembly with its associated valve seat bushing 6.

As has been pointed out, rust deposits in devices of this type occur in those areas where the water contacts air with the water being in the form of a spray. It will be noted that this condition is met in the present invention only in the lower valve chamber 4, defined by skirt 20 and nozzle 34. I have provided a construction wherein the clearances in the lower valve chamber 4 are extremely large relative to the clearances in the remainder of the valve. Thus, the combination includes stationary means defining an upper chamber and a lower chamber separated by an annular flange, and a unitary movable valve assembly including a valve member disposed in each chamber, the upper chamber and the flange serving to position and guide the movable valve assembly, and the valve member disposed in the lower chamber being separated from the walls of the lower chamber by an annular space several times greater than the corresponding space in the upper chamber. I have found that this results in minimum rust deposits in the lower chamber, there being no closely confining elements tending to hold the rust in place. I find that what rust is deposited tends to form in the lower portion of the lower chamber, so that the interior of annular skirt 20 remains relatively clean. It will also be noted that there is substantially no opportunity for a rust deposit to build up which will interfere with operation of the movable parts of the valve.

Since the water pressures met with in devices of this type are relatively low, and since it is desirable to have a construction in which there will be a substantially perfect seal when the upper movable valve member 13 rests upon gasket 8, I prefer to make the valve members in the form of elongated metal bodies having considerable weight. Thus, when the end 27 of the operating lever 21 is pivoted downwardly, the combined weights of members 13 and 14 will be adequate to maintain firm contact between the sealing face of valve member 13 and gasket 8.

While I have illustrated the valve members 13 and 14 as cylinders, it will be understood that their cross-section need not be circular. Thus, the same results may be obtained with valve members of hexagonal cross-section, and I will refer to such members as generally cylindrical.

What I claim is:

1. In a double acting poultry watering valve of the type described, the combination of valve body means providing an upper valve chamber and a lower valve chamber; means separating said chambers and provided with a valve seat for each chamber, said means including a centrally disposed bore to allow flow of water through said chambers; a movable valve assembly including an elongated upper valve member positioned concentrically within said upper valve chamber, a lower valve member positioned in said lower valve chamber, and means extending through said bore and interconnecting said upper and lower valve members for simultaneous movement, said means allowing space for flow of water through said bore; a pivoted operating lever engaging said lower valve member and arranged to move said member upwardly toward its valve seat when said lever is pivoted in one direction, so simultaneously moving said upper valve member upwardly away from its valve seat, and resilient means connected to said lever to bias the same in a direction opposite to said one direction, said upper valve member having a transverse cross-sectional area such that the effective clearance between the same and the walls of said upper valve chamber is on the order of .005–.020 inch, whereby, when said upper valve member is above its valve seat and water is supplied to the upper valve chamber at normal operating pressures, there is established a marked frictional force tending to move said upper valve member toward its seat.

2. In a double acting valve of the type described, the combination of a valve body having a vertically disposed bore and a transverse annular inwardly directed shoulder dividing said bore into an upper chamber and a lower chamber; a bushing situated in said upper chamber, said bushing having a bore aligned with the bore of said valve body, the faces of said bushing constituting valve seats; a supply conduit removably secured in said upper chamber and engaging said bushing to clamp said bushing against said shoulder; a movable valve assembly including a cylindrical upper valve member positioned concentrically within said supply conduit, a lower valve member positioned concentrically with respect to said lower chamber, and means extending through the bore of said bushing and interconnecting said upper and lower valve members for simultaneous movement, said means allowing space for fluid flow through the bore of said bushing, and said upper valve member having an outer diameter such that the annular space between said upper valve member and said supply conduit is on the order of .005–.020 inch, whereby a marked hydraulic frictional force is provided tending to force said upper valve member toward said bushing is established when liquid is supplied through said conduit at operating pressures for which said valve is constructed; and means operatively associated with said lower valve member to adjust the vertical position of said movable valve assembly to selectively open and close the valve.

3. In a double acting valve of the type described, the combination of a vertically disposed tubular valve body; a transverse annular inwardly directed flange separating said body into an upper valve chamber and a lower valve chamber; an annular bushing disposed in said upper valve chamber, the central faces of said bushing constituting upper and lower valve seats; a liquid supply pipe removably secured in said upper valve chamber and engaging the rim portion of said bushing to clamp the same against said flange; a movable valve assembly comprising elongated upper and lower movable valve members disposed respectively in said upper and lower chambers, and means rigidly connecting said members for simultaneous vertical movement relative to said bushing, said upper valve member having a transverse cross-sectional area such that the effective clearance between the same and the walls of said upper valve chamber is on the order of .005–.020 inch, whereby there is established during flow of liquid through the valve a marked hydraulic frictional force tending to move said upper valve member downwardly against its seat, which hydraulic frictional force is abruptly diminished as the valve is closed by upward movement of said lower valve member, the annular portion of said valve body below said flange being short relative to the length of said lower valve member; a tubular discharge nozzle secured to said annular portion of said valve body and extending downwardly beyond said lower valve member and an operating lever associated with said lower valve member to adjust the vertical position of said movable valve assembly to selectively open and close the valve.

4. A valve in accordance with claim 1 and wherein said upper valve chamber has a smooth cylindrical inner wall and said upper valve member is cylindrical and disposed concentrically within said upper valve chamber.

5. In an automatic poultry watering valve, the combination of an upright hollow valve body defining an upper chamber; valve seat means removably mounted within said body and having a centrally disposed opening, said body having a dependent annular skirt extending from the location of said seat means to a point a short distance therebelow; a water supply pipe threadably engaged with the upper end portion of said body to supply water under pressure to said upper chamber; a generally tubular nozzle member having an open top and a longitudinally extending slot, the open top of said nozzle member being detachably engaged with said skirt, the combination of said nozzle member, said skirt and said seat means defining a lower valve chamber; an elongated lower valve member disposed in said lower valve chamber, said lower valve member being substantially longer than said skirt and having a transverse cross-sectional area markedly smaller than the cross-sectional area enclosed by said skirt and nozzle member, whereby a substantial annular space is provided, between said skirt and nozzle member and said lower valve member; valve actuating means mounted on said body and including a pivoted lever extending through the slot of said nozzle into operative engagement with said lower valve member; an upper valve member operatively disposed within said body above said seat means, and a pin extending through the central opening of said seat means and interconnecting said upper and lower valve members for simultaneous movement, said pin being of smaller cross-sectional area than said opening, whereby water can flow from said upper chamber to said lower chamber when neither valve member engages said seat means, said valve members and seat means being removable via the upper end of said valve body when said supply pipe is removed, detachment of said nozzle member then allowing free access to the area enclosed by said skirt.

6. A watering valve in accordance with claim 5 and wherein said body is provided with an inwardly directed annular flange having an internal diameter larger than the transverse dimension of said lower valve member, said seat means includes a bushing overlying said flange, and said bushing is clamped against said flange by said supply pipe, said pin being attached to both of said valve members, the combination of said bushing, valve members and pin being removable as a unit when said supply pipe is detached from said body.

References Cited in the file of this patent

UNITED STATES PATENTS

| | | |
|---|---|---|
| Re. 23,447 | Pruitt | Dec. 25, 1951 |
| 675,665 | McCanna | June 4, 1901 |
| 2,620,829 | Tolley | Dec. 9, 1952 |
| 2,634,755 | Hobbs | Apr. 14, 1953 |
| 2,716,423 | Landgraf | Aug. 30, 1955 |